Jan. 3, 1961 H. L. IVINS 2,966,791
EXPLOSIVE ACTUATED TESTING DEVICE
Filed Dec. 2, 1955 2 Sheets-Sheet 1

INVENTOR:
HERBERT L. IVINS.
ATTORNEY.

Jan. 3, 1961 H. L. IVINS 2,966,791
EXPLOSIVE ACTUATED TESTING DEVICE
Filed Dec. 2, 1955 2 Sheets-Sheet 2

INVENTOR:
HERBERT L. IVINS
ATTORNEY.

United States Patent Office 2,966,791
Patented Jan. 3, 1961

2,966,791
EXPLOSIVE ACTUATED TESTING DEVICE

Herbert L. Ivins, Brooklyn, Ohio, assignor, by mesne assignments, to Olin Mathieson Chemical Corporation, a corporation of Virginia Filed Dec. 2, 1955, Ser. No. 550,568

15 Claims. (Cl. 73—12)

This invention relates to the testing of tubes and more specifically to testing lightning arresting tubes by simulating the pressure and arc generated within a tube during the grounding of lightning.

In certain types of lightning arresting apparatus an arc is produced when the lightning is grounded. This arc produces ozone gas and an accompanying increase in pressure. In order to confine this resultant arc and pressure a heavy walled fibre tube is provided to confine the arc and pressure therein. Normal testing methods are inadequate to determine whether or not a particular type of tube has satisfactory characteristics for this service. This is due in part to the fact that in actual use the arc and pressure are produced very rapidly and in part because the arc is directed against only a small portion of the interior wall of the tube.

It is therefore an object of this invention to provide a tube testing apparatus for determining whether or not a particular type of tube is suitable for use in snuffing the arc produced by certain lightning arresting devices.

Another object of this invention is to provide a simplified firing mechanism and safety device to prevent firing of the apparatus prior to proper assembly of the component parts.

Another object of this invention is to provide an accurate and convenient mode of measuring the testing pressure developed in the apparatus.

Another object of this invention is to provide a tube testing device which provides dependable results yet simple in operation.

Additional objects and advantages will become apparent from the following description and drawings in which.

Figure 1:
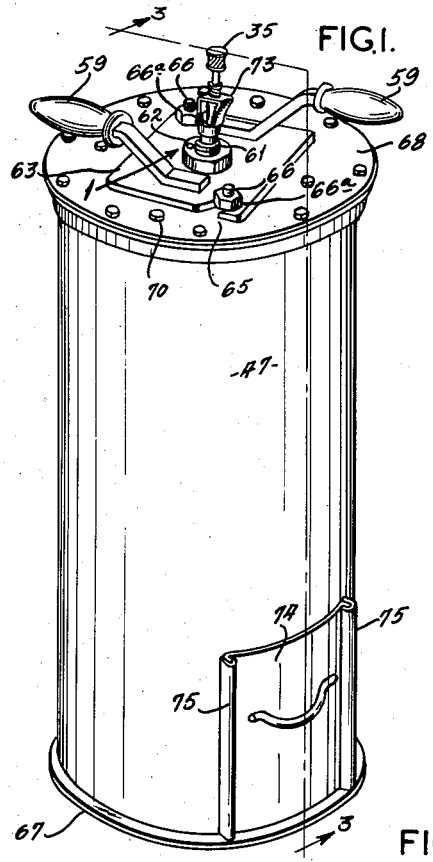
Figure 1 is a perspective view of the apparatus showing a specimen mount received in a firing canister.
Figure 4:
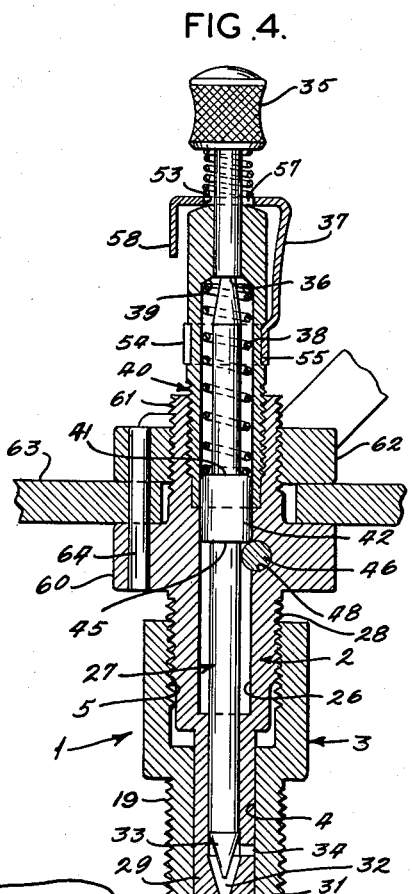
Figure 4 is a longitudinal sectional view showing the firing mechanism in the safe position when removed from the canister.
Figure 2:
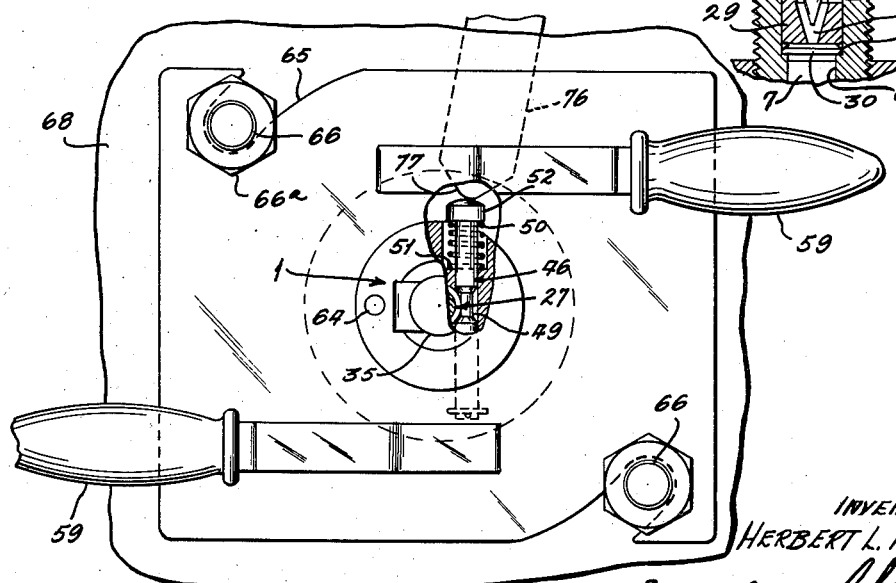
Figure 2 is a plan view of the assembled testing apparatus shown in Figure 1 with portions broken away to show the firing mechanism.
Figure 3:
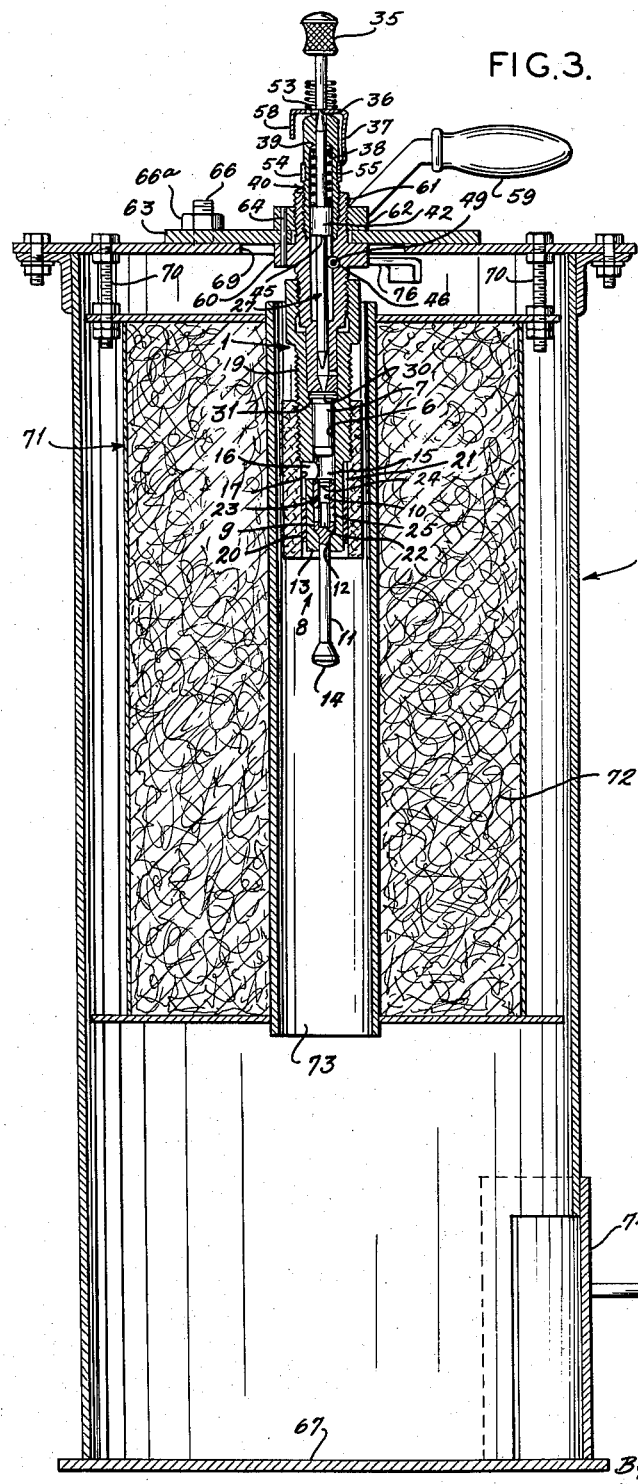
Figure 3 is a longitudinal sectional view taken on the line III—III in Figure 1.
Figure 5:
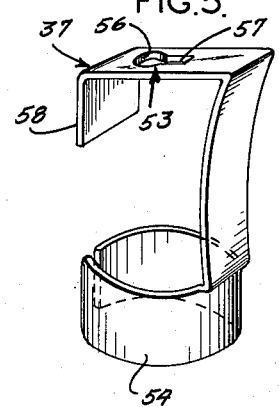
Figure 5 is a perspective view of a leaf spring trigger used in conjunction with the firing mechanism.

The invention concerns an apparatus for testing tubes by discharging an explosive force within the tube. It has been found that an explosive force, such as that produced by discharge of a conventional blank cartridge, will when properly confined within a tube produce a force similar to the force produced by the arc and gas pressure resulting during the grounding of lightning.

The specimen tube to be tested is mounted on a hollow bushing having a side opening to direct an explosive force against a portion of the inner wall of the tube. The hollow bushing has one end sealed by a blank cartridge and a firing mechanism for detonating the cartridge. The other end of the bushing is sealed by an extractor mechanism for removing the expended cartridge from the bushing. The extractor contains a device for determining the pressure produced upon discharge of the cartridge. Upon detonation of the cartridge the explosive force is discharged into the hollow bushing and directed against a portion of the inner wall of the specimen tube through the previously mentioned side opening in the bushing.

After the cartridge has been loaded into the bushing and the specimen tube properly mounted on the bushing the assembly is inserted into a canister in such a manner that upon discharge of the cartridge the explosive area is entirely confined within the canister. The canister may be provided with a muffler surrounding the tube to reduce the resultant noise.

The firing mechanism is contained in a separate housing which is screw threaded into the bushing. A safety device is provided to prevent firing of the blank cartridge prior to the proper insertion of the bushing into the canister. The safety device is a plunger which normally blocks the firing pin and prevents it from striking the cartridge primer. Upon insertion of the bushing and housing into the canister the plunger engages a cam arm fixed to the inner portion of the canister and is depressed to a position in which it no longer blocks the firing pin so that the pin is free to strike the cartridge when it is released by depressing a trigger.

After firing, the bushing and housing are removed from the canister and the housing is detached from the bushing. The expended cartridge is removed from the bushing by means of the extractor and the specimen tube is slipped off of the bushing.

Referring to the drawings, the specimen mount 1 includes a housing 2 screw threaded into a specimen bushing 3. The specimen bushing 3 is provided with a longitudinal bore 4 which includes the threaded portion 5 engaging the housing 2. The longitudinal bore 4 in the specimen bushing 3 also provides a chamber 6 for receiving near one end an explosive cartridge 7 and at the opposite end an extractor 8 for removing the expended cartridge case. The extractor 8 is telescopically received in the specimen bushing bore 4 and engages the wall of the bore with close gas sealing fit. The cartridge engaging head 9 of the extractor has a socket 10 and the end farthest from the cartridge 7 is provided with a shaft 11 extending through an aperture 12 in the free but otherwise closed end 13 of the specimen bushing 3. The free end of the shaft may be provided with any desired type of hand grip, as knob 14. Upon unscrewing of the specimen bushing 3 from the housing 2 it is merely necessary to depress the extractor knob 14 inwardly against the cartridge 7 to remove the cartridge from the chamber 6.

Between the extractor head 9 and the cartridge 7 there remains in chamber 6 a gas chamber 15 into which the explosive gas developed by the cartridge is discharged. The chamber 15 has an opening 16 in one side which directs the blast and pressure generated by the cartridge against the inner wall 17 of the specimen 18. The specimen is a heavy walled fibre tube which telescopes over the specimen bushing 3 and is secured thereto by a screw threaded joint 19. A sealing collar 20 which may be of any suitable material is spaced from the threaded portion 19 of the specimen bushing. The side opening 16 in the specimen bushing is positioned between the threaded portion 19 and the seal 20 resulting in the most intense portion of the cartridge blast being confined to a small portion of the interior wall 17 of the specimen tube immediately adjacent the side opening 16 and with the effect of the blast being reduced in the area of the wall 17 adjacent the space 21 between the tube and bushing on the side opposite openings 16.

The socket 10 of the extractor freely receives a conventional crusher cylinder 22 and a piston 23 positioned over the cylinder. The piston has a gas sealing ring 24 to prevent the explosive blast from entering the socket 10. Transverse apertures 25 through the socket wall open into the socket 10 at a point adjacent the crusher cylinder 22 to facilitate removal of the cylinder. Upon discharge of the cartridge 7 the resultant pressure forces the piston 23 inwardly against the crusher cylinder 22. By experimentation the amount of foreshortening of the cylinder length resulting from the given pressure may be determined. Crusher cylinders are normally made from copper or lead alloys and have a predetermined diameter and length. Thus by measuring the foreshortening of the length of the cylinder, for any given alloy, the pressure developed by the explosive gas can be determined. The cylinder is fixed very loosely in the socket to provide for lateral expansion resulting from the foreshortening or crushing of the cylinder.

The housing 2 has a longitudinal bore 26 receiving a spring pressed firing pin 27. A portion of the housing 2 has screw threads 28 to engage the screw threaded portion 5 of the specimen bushing 3. The inner end 29 of the housing engages the rim portion 30 of the cartridge 7. The cartridge engages the bushing chamber 6 with a snug sliding fit and is clamped between a shoulder 31 in the specimen bushing bore 4 and the inner end 29 of the housing 2. The inner end of the longitudinal bore 26 in the housing has a frusto-conical portion 32 opening through the inner end of the housing and conforming to the configuration of the pointed front end 33 of the firing pin 27. Immediately rearward of the frusto-conical portion 32 of the housing bore 26 is a small aperture 34 opening into the bore to release any air which might become entrapped and compressed in the frusto-conical portion of the bore upon release of the firing pin.

The end of the firing pin 27 opposite the pointed end 33 is provided with a hand grip or knob 35 by which the firing pin may be cocked by merely pulling the knob outwardly until a narrow undercut portion 36 of the firing pin engages a trigger latch 37. A firing pin spring 38 urges the firing pin 27 toward the cartridge 7. This spring is received between a shoulder 39 in a housing cap 40 and a shoulder 41 provided by an enlarged portion 42 of the firing pin.

The enlarged portion 42 of the firing pin 27 also provides a safety shoulder 45 engaging a cross pin 46 to lock the firing pin 27 in the cocked position and thereby prevent its release until the specimen mount has been properly seated in a retaining canister 47. The cross pin 46 is telescopically received in a bore 48 transverse to and intersecting the firing pin bore 26. The pin 46 has a portion 49 of reduced diameter which permits the enlarged portion 42 of the firing pin 27 to pass by, however, the pin 46 is normally urged by spring 50 into a position blocking the enlarged portion 42 of the firing pin. Spring 50 is positioned between a shoulder 51 in the housing and a headed portion 52 of the pin 46. The firing pin 27 is cocked before the specimen mount 1 is inserted into the canister 47. In cocking the firing pin 47 the firing pin knob 35 is grasped and pulled outwardly until the undercut shoulder 36 on the firing pin engages a latch 53 on the trigger 37. It will be seen that when the pin 46 is depressed the reduced portion 49 is aligned with the firing pin 27 permitting the enlarged portion 42 of the firing pin to pass by the pin. After the firing pin has been cocked the normal portion of the pin 46 is in alignment with the firing pin 27 thereby blocking the enlarged portion 42 of the firing pin and preventing accidental release of the firing pin in such a manner that it may strike the primer of the cartridge.

The trigger 37 is a leaf spring having a collar 54 which is received in a recess 55 in the housing cap 40. The latch portion 53 of the trigger is a keyhole-shaped aperture. The enlarged portion 56 of the aperture receives the firing pin shank when the firing pin is in the inoperative portion. The reduced portion 57 of the keyhole-shaped aperture receives the undercut of the firing pin when the firing pin is in the cocked position. The resiliency of the leaf spring normally urges the smaller portion 57 of the keyhole-shaped aperture into alignment with the longitudinal axis of the firing pin. To release the firing pin it is merely necessary to depress the leaf spring by pressure on a thumb grip 58 adjacent the latch portion 53 thereby moving the larger portion 56 of the keyhole-shaped aperture into alignment with the firing pin shank releasing the undercut portion 36 of the firing pin.

The outer end of the firing pin housing 2 includes a transversely extending flange 60 and a second threaded portion 61 which receives a nut 62. A supporting plate 63 is clamped between the flange 60 and the nut 62 and a pin 64 is wedged into aligned apertures in the nut, the supporting plate and the flange thereby locking the nut in place and preventing relative movement between the supporting plate and the housing. Opposite edges of the supporting plate are provided with notches 65 which engage lugs 66 on the canister 47 as described hereafter, and a pair of handles 59 with which to lift the specimen mount 1 and insert it into the canister.

The canister 47 is a steel container having a closed bottom end 67 and a top end provided with a plate 68 having an aperture 69 to receive the specimen mount 1. A pair of lugs 66 extend upwardly from the canister plate 68. Nuts 66a are threadably received by the lugs and the top of the lugs are peened over to prevent removal of the nuts. Alternatively, bolts may be threaded into the plate 68, in lieu of the lugs. The lugs are received in the notches 65 in the support plate. Suspended from the aperture canister plate 68 by bolts 70 is a muffler 71. The muffler is a hollow walled cylinder which receives the specimen mount 1. The hollow walls of the muffler are packed with rock wool 72 or with other non-inflammable insulation material. The inner wall 73 of the muffler is fabricated of perforated steel. The bottom of the canister is provided with a gravity door 74 which slides in a pair of channels 75. Through this door any shattered portions of the specimen tube 18 or other debris is removed.

In readying the device for testing a tube the specimen bushing 3 is unscrewed from the housing 2 and the previously expended cartridge 7 is pushed from the chamber 6 in the specimen bushing by the extractor 8. The crusher cylinder 22 is removed and new crusher cylinder is inserted into the extractor socket 10 through the side opening 16 in the specimen bushing after which the piston 23 is inserted into the extractor socket. A cartridge 7 is inserted in the chamber 6 and the specimen bushing 3 and housing 2 are screwed together, clamping the cartridge in place. The specimen tube 18 is then slipped over the free end 13 of the specimen bushing and is threaded on to the exteriorly threaded portion 19 of the bushing. The sealing collar 20 on the bushing engages the inner surface 17 of the specimen tube 18 with a tight fit providing a closed chamber 21 adjacent the side opening 16 in the bushing. The specimen mount 1 is now ready to be inserted into the canister 47. The hand grips 59 are grasped and specimen mount 1 is lowered through the hole 69 in the top plate 68 into the canister and the hollow portion of the muffler 71. The supporting plate 63 rests on the apertured plate 68 of the canister 47 with the notches 65 in the support plate aligned with the lugs 66 on the top plate. The nuts 66a which are threaded to the lugs 66 prevent the specimen mount from being inserted downwardly into engagement with the lugs and it is therefore necessary that the support plate notches be rotated into engagement with the lugs.

Immediately beneath the apertured plate 68 of the canister 47, and fixed to an inner surface of the canister is a cam arm 76. This arm is so positioned that the specimen mount 1 may be lowered into the canister 47 and muffler 71. As the specimen mount 1 is rotated by means of the handles 59 into interlocking engagement with the lugs 66, the head 52 of the pin 46 is depressed by the cam portion 77 of the cam arm 76. As the pin 46 is depressed the reduced portion 49 of the shank is aligned with the firing pin 27 to permit the enlarged portion 42 of the firing pin to pass by so that the point 33 may strike the primer 30 of the cartridge 7 when the trigger thumb grip 58 is depressed. The safety feature provided by the pin 46 and cam arm 76 eliminate the possibility of the cartridge 7 in the specimen mount 1 being accidentally discharged prior to proper emplacement of the specimen mount in the canister. After the specimen mount 1 has been inserted into the canister 47 and rotated into proper engagement with the canister lugs 66 the nuts 66a are tightened down. The firing pin 27 is then cocked by pulling outwardly on the firing pin knob 35 until the undercut shoulder 36 on the firing pin is interlocked by the small portion 57 of the keyhole-shaped aperture 53 in the trigger 37 and the assembly is completed and ready to fire. It is then merely necessary to depress the trigger thumb grip 58 to fire the cartridge. After the cartridge has been detonated the lug nuts 66a are loosened, the specimen mount is rotated out of engagement with the lugs and is lifted out of the canister. The specimen tube 18 is unscrewed from the specimen mount bushing 3, the bushing 3 unscrewed from the housing 2 and the cartridge 7 removed from its chamber 6, all as previously described. Any portions of the damaged tube 18 which have fallen into the bottom of the canister 47 may be removed by lifting the canister door 74 and raking out the debris.

Although the invention has been described with particular reference to a device for testing an arc arresting tube the apparatus is equally suitable for many other uses which will be apparent to one skilled in the art. It is to be understood that although the invention has been described with reference to one specific embodiment it is not to be limited to this specific embodiment nor to the particular component parts thereof and that various modifications and other embodiments will become apparent to one skilled in the art. The invention is therefore not to be limited to the previously described embodiment or components except as set forth in the appendent claims.

I claim:

1. Apparatus for testing the resistance of a portion of a specimen to a high temperature gas blast of short duration and high impulse pressure comprising a first member having means to receive an explosive and support a test specimen and access means so disposed in said member between said explosive and specimen to release the hot blast of said explosive directly against a predetermined surface portion of said supported specimen, said first member being received by a second member having protective means to substantially confine said explosive and specimen, and cooperating means on said members to prevent release of said explosive blast when said first member is not protectively received by said second member.

2. A tube testing device comprising a canister detachably receiving a tube testing mount, means operatively interlocking said mount in said canister, said mount comprising a bushing adapted to telescopically receive said tube to be tested, means on said mount to hold an explosive blast generating cartridge and means in said mount to direct said explosive blast against the interior wall of said tube, said mount including a firing mechanism for releasing said explosive force, and safety means responsive to the position of said mount relative to said canister to prevent release of said explosive force when said mount is not operatively positioned in said canister.

3. The device of claim 2 wherein the firing mechanism comprises a body portion having a firing pin telescopically received in a bore in said body portion and normally urged in one direction, and a second bore in said firnig mechanism transverse to and intersecting said first bore; said safety means comprising a plunger received in said second bore and having means comprising a first portion to prevent said firing pin from moving in said direction and means comprising a second portion movable into alignment with said first bore to permit said firing pin to move in said direction; and means on said canister to move said plunger from said first position to said second position only when said tube mount and canister are in the operatively interlocked position.

4. The tube testing device of claim 2 wherein said operatively interlocking means is of the type so arranged that said mount must first be completely inserted into said canister and then the canister and mount must be rotated relative to each other to operatively position said mount in said canister with respect to said safety mechanism.

5. In a tube high temperature impulse pressurizing device, means to mount both said tube and an explosive, said explosive being positioned in said means for exploding it to form a hot gas blast in proximity with the interior of said tube for simulating such high temperature impulses pressurizing effect, and sleeve means to direct the hot exploding gas of said blast against one part of the side wall of said mounted tube with confinement of said effect of said gas to shield the remaining part of said tube and to concentrate most of said effect at a predetermined fractional portion of the interior of said wall constituting said one part.

6. In an arc suppressor tube testing device, means for mounting an explosive gas blast generator and a tube mounting member adapted to receive said blast through a connection with said means and to be received within the hollow of said tube to be tested and having engaging means for engaging the interior wall of said tube adjacent its ends with a gas tight fit, and passage means in said member to direct said explosive blast against a portion of the interior wall of said tube intermediate said engaging means, said portion corresponding to that portion of similar tubes against which the arc is expected to act.

7. A tube testing device comprising means for carrying an explosive hot gas blast generating cartridge in the form of a hollow bushing adapted to be received in said tube to be tested, said bushing having side wall means to engage a part of the interior wall of said tube with a gas tight fit, an aperture through said side wall and opening into a hollow portion of the bushing, means mounted on said device to discharge said cartridge into the hollow portion of said bushing whereby said explosive force is directed through said opening and against another part of the interior wall of the tube to be tested.

8. The device of claim 7 wherein the cartridge is carried adjacent one end of the bushing and wherein the means to discharge said cartridge is mounted detachably with respect to said bushing, said device including means for ejecting a spent cartridge upon detachment of said discharge means from said bushing.

9. The device of claim 8 wherein the ejector means is a plunger slidably mounted at the opposite end of said bushing.

10. In an explosive cartridge actuated device of the type described, a cartridge detonating mechanism including a biasing means, a firing pin having a shank, and means for manually cocking said pin against said biasing means to adapt said shank to be urged in the direction of said cartridge with sufficient force to detonate the cartridge, the improvement comprising a resilient trigger means providing a bias in one direction and including a first opening through which said shank is freely slidable and means to maintain said firing pin cocked, said means comprising a second opening interconnected with said first opening and smaller than the shank of said firing pin, said second opening being urged by said member in said direction for receiving an undercut portion on said firing pin when said mechanism is in the cocked position, and finger grip means on said member for directly pressing it in the opposite direction whereby said firing mechanism is released upon movement of the first opening in said opposite direction into alignment with said firing pin shank.

11. In an explosive cartridge actuated device of the type described, a firing mechanism for detonating an explosive cartridge, said mechanism comprising a firing pin spring and a firing pin having a shank portion adapted to be resiliently urged in a first direction by said spring and means to maintain said firing pin in a cocked or ready to fire position, said means comprising a bent leaf spring integral with a resiliently urged trigger biased in one direction transversely with respect to said first direction and having a keyhole-shaped slot with a closed periphery telescopically receiving said firing pin shank portion, an undercut portion on said firing pin of such size as to be received in the smaller portion of said keyhole-shaped slot under said bias and finger grip means on said trigger adjacent one end of said trigger adapted for pressing it in the opposite transverse direction, when said firing pin is in the cocked position, the smaller portion of said keyhole-shaped slot being smaller than said shank, whereby movement of the larger portion of said keyhole slot into alignment with said firing pin releases the firing pin from the cocked position.

12. The firing mechanism of claim 11 including a safety to prevent release of said mechanism, said safety comprising a shoulder extending transversely outwardly from said firing pin and a plunger engaging said shoulder in a first position to constrain said pin and movable to a second position wherein an undercut portion of said plunger is aligned with said firing pin, said portion being of such reduced size as to permit passage of said shoulder.

13. The combination of claim 12 movably mounted with respect to a protective housing member detachably securable by said movement to the firing mechanism, wherein said member includes means to move the plunger from the first to the second position when said mechanism is moved into secured relationship with respect to said member.

14. An explosive cartridge actuated tube specimen testing device having a protective housing member, a cartridge firing mechanism comprising a body member having a bore and means for detachably securing said housing and body members together, said body member having means to mount said cartridge and attach said specimen for operative association with each other through said bore, a spring actuated firing pin slidably mounted in said bore for movement to a firing position, a bent leaf spring mounted at one end on said body member to form a trigger having adjacent the other end an opening therethrough telescopically receiving said pin, one side of said opening being adapted to resiliently engage a shoulder of said pin in retracted position for maintaining said mechanism cocked, and the opposite side of said opening being adapted to be pressed into alignment with said pin to pass said pin for release of said mechanism, and a safety mechanism comprising a plunger mounted for movement in said body member in a second bore therein intersecting said firing pin carrying bore, said plunger having a first portion for abutting with a portion of said pin to prevent pin movement to said firing position and a second portion smaller than the first to permit said pin portion to by-pass said plunger moved to align said second portion with said pin, means to urge said plunger normally to said first position and a cam arm on said housing member adapted to engage and move said plunger from said first to said second position when said body and housing members are operatively secured together.

15. An explosive cartridge actuated testing device comprising a bushing with a bore having a gas pressure outlet and a receiver for said cartridge, and means to detonate a cartridge in said bore, and means to remove the expended cartridge case from said bore, the last said means comprising a plunger telescopically received in said bore, said plunger having means to measure the gas pressure developed in said bore on detonation of said cartridge, the last said means comprising a socket in communication with said outlet and adapted for receiving a crusher cylinder and a piston in said socket between said crusher cylinder and said outlet.

References Cited in the file of this patent

UNITED STATES PATENTS

| | | |
|---|---|---|
| 547,933 | Mauser | Oct. 15, 1895 |
| 815,468 | Dupont | Mar. 20, 1906 |
| 1,681,172 | Cocho | Aug. 21, 1928 |
| 1,726,228 | Juhasz | Aug. 27, 1929 |
| 1,922,320 | Olin et al. | Aug. 15, 1933 |
| 2,377,425 | Jackson | June 5, 1945 |
| 2,618,963 | Wagenhals | Nov. 25, 1952 |
| 2,648,926 | Ackerson | Aug. 18, 1953 |
| 2,656,636 | Green | Oct. 27, 1953 |
| 2,701,931 | Polny | Feb. 15, 1955 |

FOREIGN PATENTS

| | | |
|---|---|---|
| 738,790 | Germany | Sept. 1, 1943 |